United States Patent [19]

Conway et al.

[11] Patent Number: 5,214,793
[45] Date of Patent: May 25, 1993

[54] ELECTRONIC BILLBOARD AND VEHICLE TRAFFIC CONTROL COMMUNICATION SYSTEM

[75] Inventors: Earnest J. Conway, Carmel; James L. Deckert, King City; F. Russell Richards, Monterey, all of Calif.

[73] Assignee: Pulse-Com Corporation, Monterey, Calif.

[21] Appl. No.: 669,823

[22] Filed: Mar. 15, 1991

[51] Int. Cl.⁵ .............................................. H04B 1/00
[52] U.S. Cl. ................................ 455/49.1; 455/70; 340/905
[58] Field of Search ............... 455/49, 67, 70, 345, 455/168.1; 340/905; 364/424.02, 424.01

[56] References Cited

U.S. PATENT DOCUMENTS

| | | | |
|---|---|---|---|
| 4,270,117 | 5/1981 | Ziegelbein et al. | 455/183.1 |
| 4,510,622 | 4/1985 | Mori et al. | 455/67.5 |
| 4,812,843 | 3/1989 | Champion, III | 340/905 |
| 5,020,143 | 5/1991 | Duckeck | 455/186 |
| 5,065,452 | 11/1991 | Duckeck et al. | 455/345 |

FOREIGN PATENT DOCUMENTS

| | | | |
|---|---|---|---|
| 0349470 | 1/1990 | European Pat. Off. | 340/905 |
| 3810178 | 10/1989 | Fed. Rep. of Germany | 455/345 |

*Primary Examiner*—Reinhard J. Eisenzopf
*Assistant Examiner*—Christine Belzer
*Attorney, Agent, or Firm*—Davis & Schroeder

[57] ABSTRACT

A communication system uses simple microwave transmitters disposed along roadways and in-vehicle mounted receivers to transmit encoded signals to produce location-specific commercial, traffic regulatory, emergency and other information to operators of motor vehicles. An optional remote interface links transmitters to regulatory and commercial users in real-time. A microprocessor in the receiver uses the coded signals to produce messages from prerecorded messages or from message parts stored in a replaceable memory device, and to provide the messages either audibly, visually or both. The microprocessor functions under operator supplied instructions to select certain message types for display and to reject unwanted messages. The memory device is recorded in one or more languages to allow the operator to select a preferred language for message presentation.

33 Claims, 14 Drawing Sheets

ELECTRONIC BILLBOARD AND VEHICLE TRAFFIC CONTROL COMMUNICATION SYSTEM

TECHNICAL FIELD

The present invention relates to a low cost communication system to communicate information to the drivers of vehicles while traveling along roadways. More particularly, the system relates to information transfer by means of short bursts of microwave pulses from independent transmitters placed in selected locations along roadways. The transmitted signals are coded prior to transmission and decoded after being received by receivers installed in the vehicles. After decoding the pulses, the receivers retrieve complete messages from a data base included as part of the in-vehicle receiver system. Depending on selection criteria specified by the driver, the messages are displayed or replayed audibly. The messages may be decoded and displayed or replayed in whatever language the driver selected for the onboard database.

BACKGROUND ART

Americans spend up to ten percent or more of their waking hours travelling between home, work, school and shopping facilities. In addition, they spend many more hours on the highways travelling for pleasure. This represents a substantial opportunity for advertisers to reach their potential customers with roadside advertisements. In the past, such advertisements were communicated by way of billboards which were placed along the highways. This advertising occurs at a time when the motorists are most likely to respond. Often the response to this advertising is immediate in that the driver leaves the highway and patronizes the establishment which placed the advertisement. The ability to communicate a message at the precise time the receptor is willing to respond is the goal of virtually all commercial communications. If the advertiser has direct control over the timing of the advertisement transmission, the effectiveness of the advertisement may be more directly observed and correlated.

In many locations, however, billboard advertisement along the national highways is forbidden and is likely to be banned in many more locations owing to present day environmental and aesthetic considerations. Therefore an inexpensive and convenient method of communicating service information is extremely desirable to replace the locality-specific billboards.

Perhaps more importantly, the motorist needs roadway regulatory and advisory information to safely and efficiently travel to his or her destination. A system for communicating current roadway safety information, such as speed limits, road conditions, traffic density, accidents, and other obstructions to the flow of traffic, in an easily assimilated format, would assist the driver to safely adjust to potential problems. For this type of information to be useful it must be both accurate and timely. It is not uncommon for highway advisory signs to be missed by drivers due to their being obscured by other traffic, obstructions to vision such as rain, snow or fog, or the driver's attention being directed elsewhere at the time the sign is readable.

Similarly, navigational information such as the proximity of desired exits from controlled-access highways or turns off of the current roadway, would assist the driver to prepare for and make directional turns both efficiently and safely. Thus, on-board navigational systems which would automatically determine the present location of the vehicle and provide directions to a desired destination to assist the driver when traveling in unfamiliar areas is also desirable.

Improvement in the art of communicating traffic and commercial information to drivers has been the subject of numerous efforts in the past. U.S. Pat. No. 3,899,671 (Stover) discloses an automobile communication system which consists of radio broadcast stations located along highways and receiving devices located in the vehicles so that the driver can receive information pertinent to the location of the transmitter. Stover further discloses that the driver may instruct a device in the vehicle system as to which highway the driver desires to travel or to select certain types of information from that broadcast.

The system disclosed by Stover utilizes a transmitting means which broadcasts signals which contain detailed information pertinent to the location of the transmitter. Such information may concern traffic control signals, intersections and exits, or highway identification messages. This information is stored in a memory device associated with the transmitter and broadcast on a cyclic schedule.

This information is received by vehicle-mounted receiving means and selectively edited in accordance with the instructions provided by the operator. The desired information is then presented to the driver in either audible or visual format. The data processor in the vehicle must wait for the desired information to be transmitted to it before the information is selected and presented. This limits the time available for the transmitter to complete an information cycle. As the broadcast cycle becomes extended, the transmitter power must be increased and the broadcast time extended to insure that the information is reliably received before the vehicle passes the transmitter. The broadcast transmitters also must be separated in either space, time or frequency to avoid interfering with one another.

Stover teaches that the information transmitted by the system may be altered in real time by connecting remote sensors to the transmitter input. An application suggested by Stover is the addition of sensors which detect the status of traffic signals which affect traffic beyond the location of the transmitter. This information is then used to access appropriate messages in the transmitter database. Stover does not suggest, however, that non-routine information such as changing highway conditions or traffic patterns could be incorporated into the broadcast signal in an interactive, real-time manner. Neither does Stover suggest the incorporation of commercial messages into the system.

U.S. Pat. No. 4,481,584 (Holland) discloses a method and apparatus for providing highway information by means of a microprocessor and a plug-in data cartridge. The plug-in cartridge permanently stores in digital form a multitude of data related to services and other pertinent information available along a selected roadway. Each of these data is indexed according to distance or mile marker indicators along the roadway. A keyboard serves as a data entry means for the motorist to manually input the required location information necessary to indicate the section of highway for which he or she desires roadway information. In use, the driver must manually provide to the computer the vehicle present location relative to a highway mile marker and the present direction of travel. If the driver, for whatever reason, is unable to determine the present vehicle location, he must wait until he sees the next mile marker, thereby losing possibly relevant desired information. The system may also allow the selection of type of information desired. However, Holland does not teach that the driver may preselect the type of information desired for each location; rather, a complete set of different instructions must be provided for each location.

The computer in Holland combines this information with the data in storage and provides the programmed response. The system retrieves all stored information related to the data input by the driver and provides a visual display and/or audible speech synthesis means for conveying the information to the driver.

The data storage module described by Holland may be a plug-in magnetic disk, tape or laser disk which has been programmed with the available or desired information on a highway or system of highways. Holland suggests arranging the data modules by state or interstate highway systems. The information contained in storage is current as of the time the module is programmed. Holland does not suggest any method of providing real-time update or rapid revision to the information available to the motorist, nor does he suggest that complete messages may be synthesized from information existing in the database.

U.S. Pat. No. 4,816,827 (Baloutch et al.) discloses a system of broadcasting signals to activate audible messages associated with traffic signs. Baloutch describes an infrared transmitter which transmits an encoded signal peculiar to the type of traffic sign. The transmitter is triggered by a sound detector which detects the approach of a vehicle. A receiver in the vehicle receives and translates the code into an audible signal peculiar to the type of traffic sign. Baloutch further discloses that an additional coded signal may be activated remotely as required to provide warning of traffic conditions ahead. Among other disadvantages, since infrared signals are dispersed by rain, snow, heavy fog or other high humidity atmospheric conditions, this system would work well only during relatively clear atmospheric conditions.

U.S. Pat. No. 4,023,017 (Ceseri) discloses a complex traffic control system utilizing groups of detectors to determine traffic conditions, a central controlling computer, and a communications system to communicate encoded and clear messages between detectors, traffic warning signs along the roadway, and to receivers in vehicles. Ceseri describes a system wherein the detectors are grouped on posts along a highway and determine vehicle movement and ambient environment information. Information such as vehicle speed, traffic density, precipitation, and temperature are collected by the detectors and transmitted over cable or by radio broadcast to a central computing system. The central computer determines if these parameters, along with highway design information such as grade, number of lanes, and road surface, are within expected ranges. Combinations of these factors which are not within the predetermined parameters are used by the central computer to activate warning signs and to alert human controllers that problems may exist. The human controllers then take appropriate action such as turning on warning signs or broadcasting warnings to vehicle-mounted receivers. Audio or visual devices associated with the receivers alert the drivers to the abnormal conditions.

U.S. Pat. Nos. 4,527,155 (Yamaki et al.) and 4,937,570 (Matsukawa et al.) address the presentation of data from vehicle-mounted navigational systems to the driver. Yamaki utilizes a computer provided with coordinate data and a direction of travel sensor to rotate visual data for presentation to the operator. Yamaki discloses a method of rotating diagrammatical displays, i.e. a "map", so that the direction of travel is always presented in one direction, while simultaneously presenting the map labels in an upright, easily read format.

Matsukawa discloses a route guidance display device which receives signals from an on-board computer which utilizes an external memory programmed with map data, an input device which indicates starting and destination points, and direction and distance sensors. The display provides in a three dimensional diagram visual indication of the appropriate direction of travel at intersections between the starting point and the destination.

U.S. Pat. No. 3,105,119 (Cory, Jr., et al.) discloses a highway communications system which utilizes a dual transmitter system to first enable a receiver with a trigger signal in one frequency band followed by a message signal in a different band. The communications system transmits entire messages to the in-vehicle receiver. Cory neither teaches nor suggests how to increase the number of messages conveyed to the driver.

U.S. Pat. No. 3,105,120 (Hanysz) discloses a highway communications system which broadcasts messages to vehicles traveling along a roadway by use of a dual transmitter arrangement. Hanysz describes how a first transmitter provides a signal which enables an in-vehicle receiver which is thereby prepared to receive the information transmitted by a second transmitter. Hanysz does not suggest, however, how a single transmitter could provide unidirectional signals to a receiver.

U.S. Pat. No. 4,630,209 (Saito et al.) discloses a vehicle-based system to electronically present to the driver a map of the area in which the driver is operating. This provides the driver with information on where streets, intersections etc. are located relative to each other. Saito does not however suggest how the driver can ascertain where he is relative to any particular point on the electronic map.

U.S. Pat. No. 4,190,819 (Burgyan) discloses a programmable automobile information system utilizing a tape recorder to deliver sequential prerecorded messages. The recorder receives start and stop signals from a microprocessor which translates distance traveled information from the vehicle odometer into appropriately timed signals to operate the recorder. The recorded message may be routing directions to a preselected destination or information about the area through which the vehicle is passing. Burgyan further discloses a means for the operator to resynchronize the tape with a landmark described on the tape. Burgyan does not however suggest how the system could be automated with location information for a randomly moving vehicle.

U.S. Pat. No. 4,350,970 (von Tomkewitsch) describes a system for determining traffic situations and providing route guidance and other information to vehicles on a highway system. This system utilizes unspecified transmitting and receiving devices to communicate data carried from one roadside site to another by the vehicle itself, along with a time measurement for completing one part of a preplanned route. That information would then be used to provide route information to assist the driver in travelling to the next roadside site. Since von Tomkewitsch does not specify a recommended communications system for the transmission of such information, it is not clear how the system communicates with a large number of vehicles simultaneously at each location. This patent also does not address the immense amount of computational time needed to recommend optimum routes to each passing vehicle.

In addition to prior art patents, there have been a number of studies conducted by state and federal transportation agencies which provide insight into the types of displays that are most effective in communicating with drivers in moving vehicles. These studies provide analyses of the requirements of safety and hazard warning systems. A study completed by Commonwealth Research Corporation in April, 1982, provides an analysis of the requirements that must be met in order to successfully build a dedicated safety and hazard warning communications system for vehicles. This study specifically rules out receivers operating in anything but standard broadcast bands because of the cost of installing a different receiver and a separate antenna in vehicles.

The U.S. Department of Transportation (DOT) has started to develop the concept of the Intelligent Vehicle Highway System (IVHS) wherein dynamic roadway information could be provided to the driver. Early DOT concepts envisioned using sensors to collect and feed roadway information to central computers for analysis. The results would be retransmitted back to the driver via satellite communication networks, AM/FM radio networks or other sophisticated and expensive technologies. This concept was formalized in the DOT Policy Statement in 1989 and published in the 1990 annual report.

The International Congress on Transportation Electronics, sponsored by the Society of Automotive Engineers and held in Detroit, Mich. in October, 1990, provided a forum for most of the international projects that are concerned with roadway communication systems, vehicle navigation, and traffic management systems. Several papers published in "Vehicle Electronics in the 90's: Proceedings of the International Congress on Transportation Electronics", outline systems under development by governments and companies in Asia, Europe, and the United States. None of these papers describe systems under development that would meet the low cost requirement for wide spread utilization by non-business users.

The electronic communications art is rapidly becoming the primary communications method by which an individual receives information. Modern day society relies on the electronic communication of information by either radio or television. Communication of vehicle-specific information to motorists, however, is not well developed. The adaptation of this medium to real-time vehicle operations depends on the ability to present pertinent information to the driver in a timely manner without greatly distracting him or her from the driving task.

DISCLOSURE OF INVENTION

The Electronic Billboard and Vehicle Traffic Control Communication System (hereinafter called "Billboard System") provides a means to simultaneously satisfy the demands of advertisers, consumers and current social pressures which support the removal of billboards along the highways. The present invention replaces large unsightly billboards and signs and provides the motorist with more and timely information without distracting him or her from safely operating the vehicle. The system of the present invention allows the driver to select the desired type of message at the time it is needed. This represents true "point-of-decision" advertising. Application of the Billboard System to nonvehicular uses is also possible. While the present invention is described for use by vehicle operators, other applications are briefly described as well.

The Billboard System also provides motorists with a display of highway regulatory and traffic advisory and other public service messages within their vehicle as they travel the highway. Safety and regulatory messages are communicated on a priority basis. With the use of appropriate programming, the Billboard System allows the motorist to preselect the type of message desired at a time convenient to him. For example, a motorist desiring directions on how to reach a destination would be interested in highway identification and direction information. A motorist requiring fuel, food or lodging may select the desired type of information. No other form of advertising is capable of communicating this immediate, location-specific knowledge to consumers and providing timely feedback to the advertiser as to the effectiveness of the advertisement. This form of advertising is cost efficient and effective for the advertiser, and provides a needed service to the motorist-consumer.

The Billboard System comprises small, simple, low cost, low power, directional microwave transmitters mounted along the highway right-of-way or aimed at the highway from private property near the roadway. Currently available low cost technology allows the use of a multitude of transmitters in the system. These transmitters transmit a short encoded message for providing locality-specific information which corresponds to the location of the transmitter. In addition, individually coded keys for advertisers may be transmitted. The use of coded messages reduces the duty cycle of the transmitters and allows multiple transmitters to use the same frequency band without interference with each other.

Microwave communications systems have nearly ideal characteristics for use in roadway applications because the transmitted signals can be aimed. This efficient directional capability allows low-power transmitters to send signals over relatively long distances. This advantage has not been exploited in the past for highway communications, however, because of the high cost of conventional microwave transmitters and receivers precluded their use where a very large number of them were required.

Most of the complexity and associated cost of conventional microwave systems is avoided in the present invention by eliminating the need for strict frequency control of the communication signal.

The encoded messages transmitted by the Billboard System transmitters are received by an inexpensive in-vehicle intelligent receiver which permits the driver to select the desired type of information and allows the information to be formatted and communicated in the most efficient manner. The use of encoded messages allows one transmitter network to support multiple users simultaneously. The transmission of coded messages allows multiple transmitters to use the same carrier frequency without interfering with each other.

The information processing program and the database resident in the replaceable memory module in the in-vehicle smart receiver determines how the transmitted encoded message is used. The program provides for decoding of the encoded signal, selection of messages resident in the database which correspond to the encoded signal, and synthesizing of complete messages from message fragments in the database in response to directions contained in the coded signal. The program also responds to specific instructions from the driver to display only selected messages. The range of messages possible may be updated or changed by use of plug-in modular memory devices for the database. The smart database in each vehicle receiver stores full messages and permits construction of new messages from the transmitted codes which are linked together by the receiver. Program instructions in the database permit the receiver to perform different functions such as navigation, commercial message display and safety information presentation.

The driver determines the preferred language for data presentation by selecting the appropriate system function and database. This negates the need for the transmitted signal to contain specific language references and allows one transmitter to simultaneously communicate in any number of languages via encoded messages.

The system provides storage for the last several, usually two or three, transmitted signals received. By simple logic circuitry, the system then determines the direction of travel and average speed. This information allows the system to predict subsequent transmitter codes and to present the information desired relevant to the future location of the vehicle. This capability provides specific directions to drivers regardless of the direction of approach to an intersection or location. The information for previous locations may also be recalled if desired.

The use of encoded message transmitters also allows portable transmitters to be installed in emergency vehicles. These portable transmitters are capable of providing information to drivers about the movement or direction of approach of emergency vehicles and the location of emergency situations.

BRIEF DESCRIPTION OF THE DRAWING

For fuller understanding of the present invention, reference is made to the accompanying drawing in the following detailed Description Of The Preferred Embodiment of the invention. In the drawing.

Figure 1:
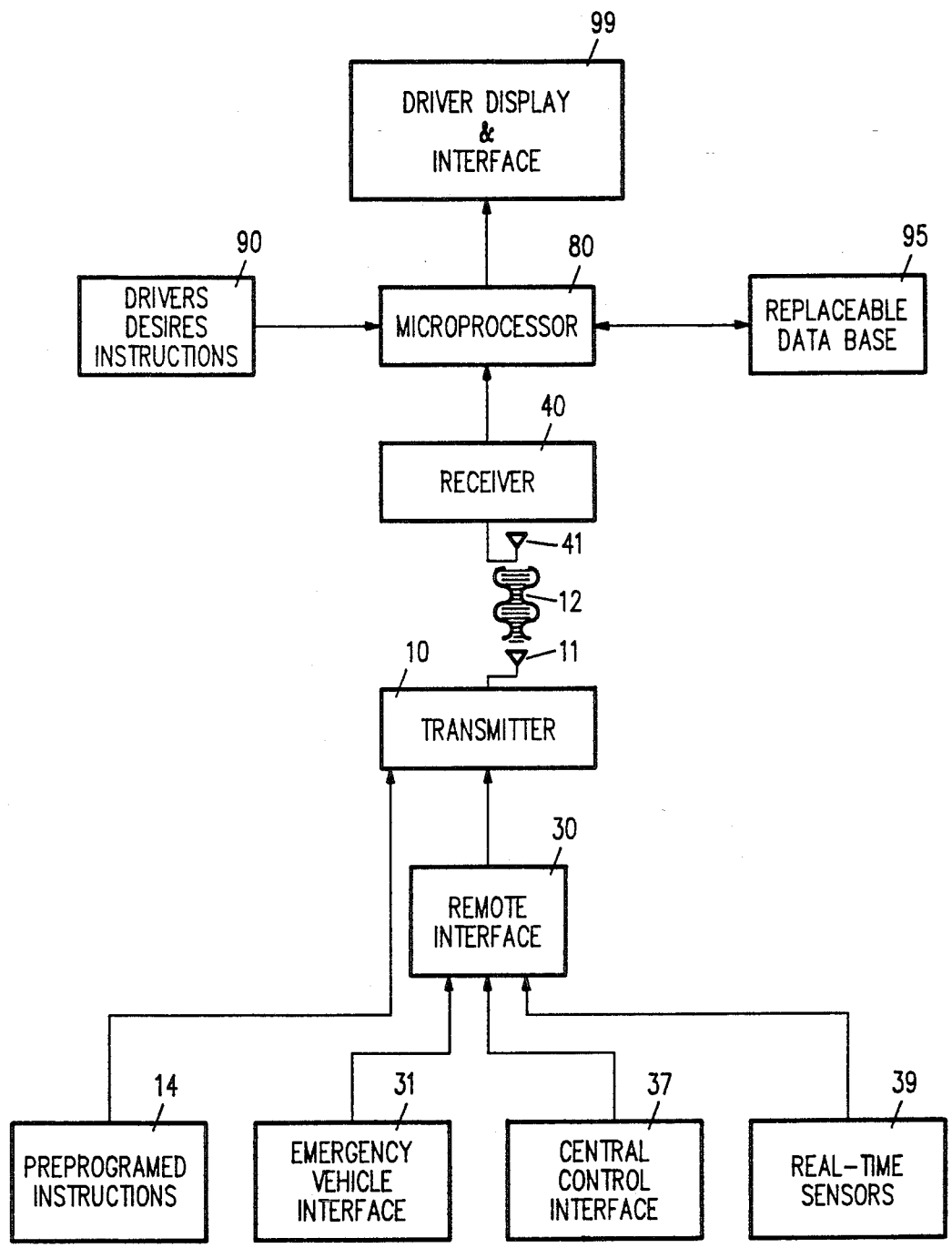
FIG. 1 is a block diagram of the complete Electronic Billboard and Vehicle Traffic Control Communications System constructed according to the principles of the present invention.

Reference numbers refer to the same or equivalent parts of the present invention throughout the several figures of the drawing.

BEST MODE OF CARRYING OUT THE INVENTION

Referring now to FIG. 1, a simplified block diagram of Billboard System 100 is shown. Transmitter 10 is installed at known locations alongside or near highways as described hereinbelow. Preprogrammed instructions 14 are utilized by transmitter 10 to modulate transmitted signal 12 in a manner unique to each transmitter. Preprogrammed instructions 14 consist of a specific location identifier, codes appropriate for each subscriber who wishes their message to be accessed for that location, and any unchanging location-specific safety or warning information for each transmitter installation.

Additional instructions to transmitter 10 may be received through remote interface 30. These additional instructions may consist of emergency vehicle instructions 31, central control instructions 37 or real-time sensor instructions 39 as described hereinbelow.

On a predetermined cycle transmitter 10 transmits a low powered microwave signal 12. Signal 12 consists of encoded information dictated by preprogrammed instructions 14 and any additional instructions provided through remote interface 30 from emergency vehicle interface 31, central control interface 37 and real-time sensors 39. Signal 12 is received and decoded by receiver 40 and microprocessor 80.

Receiver 40 receives encoded signal 12 with antenna 41 and processes signal 12 in a manner well known in the microwave communications art. Antenna 41 may be a directional antenna such as a standard gain horn antenna tuned to the appropriate carrier frequency band. Alternative, it may be a substantially omnidirectional antenna such as a quarter-wave length dipole or stub antenna. Signal 12 is decoded by microprocessor 80 and temporarily stored. Microprocessor 80 utilizes driver instructions 90 to retrieve the appropriate information related to decoded signal 12 from replaceable data base 95 which will satisfy driver instructions 90. Microprocessor 80 then displays the desired information at driver display and interface 99. Driver display and interface 99 may be any device common in the communications art such as an audio speaker, cathode ray tube or liquid crystal display, or a combination of these, or any other means capable of readily conveying information.

Signal 12 comprises a modulated carrier frequency in the microwave range, approximately 10 GHz to 35 GHz. Other frequencies may be used if necessary due to frequency allocation decisions by authorities. The frequency of the transmitters will be allowed to drift with oscillator temperature within a band approximately 150 MHz wide. This allows low-cost, cavity-tuned, Gunn diode oscillator technology to be used for the transmitters. This drift also provides random frequency diversity for different transmitters as each oscillator drifts in a manner unique to itself.

Emergency vehicle interface 31 provides signals which allow emergency vehicle operators to assume local control of traffic management based on local emergency situations. Central control interface 37 provides traffic control management information from an appropriate governmental or other regulatory agency which may be based on information received from real-time sensors 39 via remote interface 30. Real-time sensors 39 sends location specific traffic and other environmental conditions such as temperature, fog, water, high winds and the like.

Figure 2:
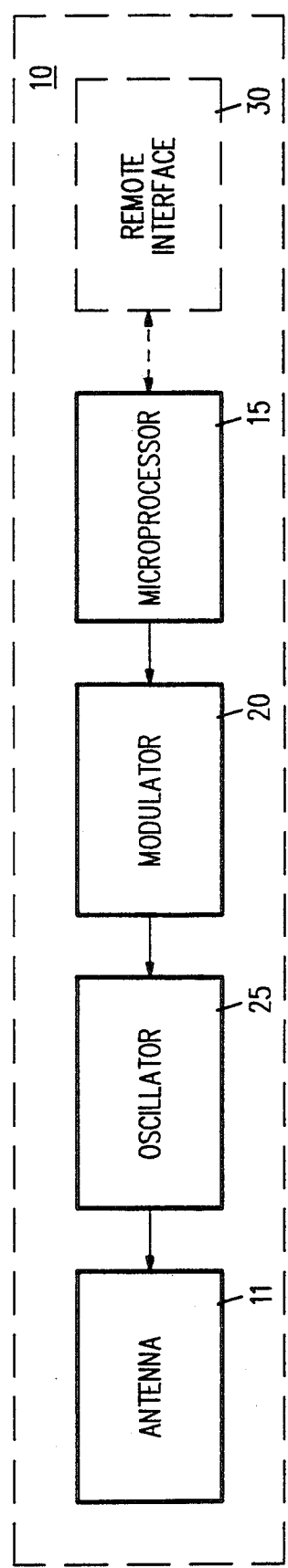
FIG. 2 is a block diagram of the transmitter of the system of FIG. 1.
Figure 3:
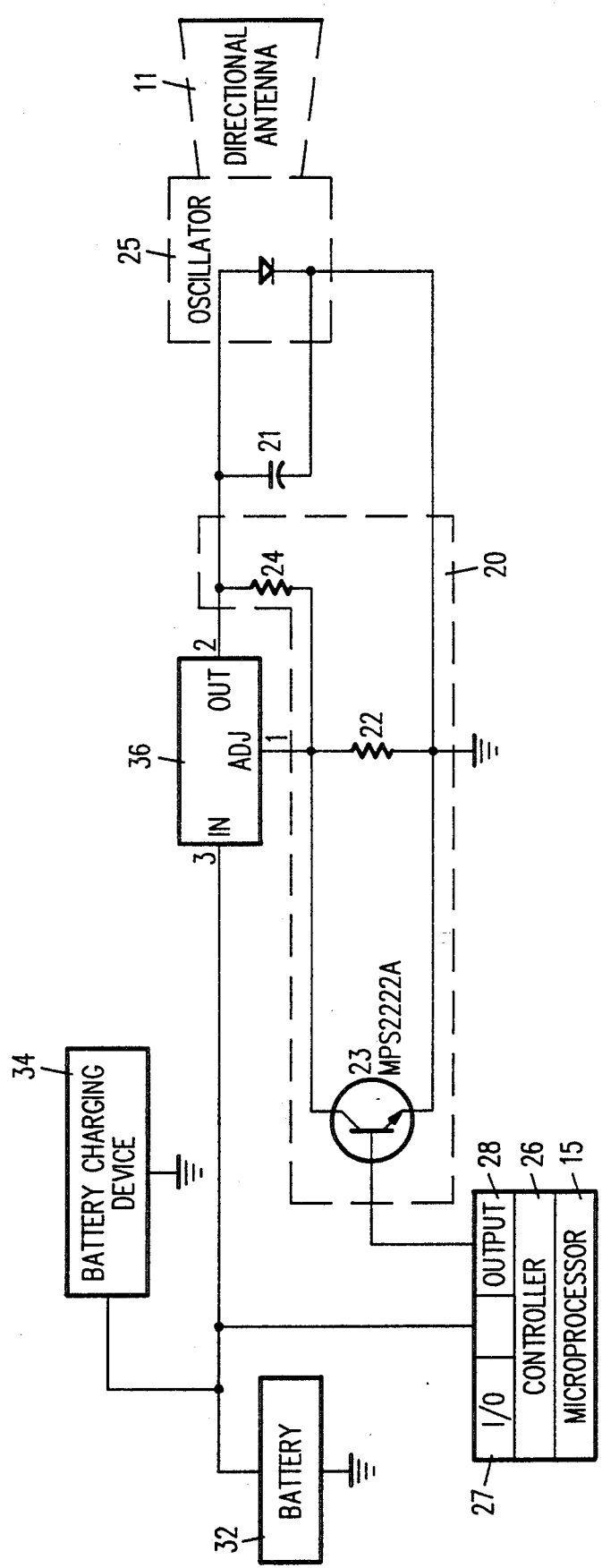
FIG. 3 is a simplified schematic of the transmitter of FIG. 2.

Referring now to FIGS. 2 and 3, the essential details of low power microwave transmitter 10 are shown. Transmitter 10 consists of a microprocessor 15 which utilizes preprogrammed instructions 14 and, if present, instructions from remote interface 30 to drive modulator 20 and oscillator 25 to form microwave signal 12 which is transmitted through antenna 11.

Operating under simple program control instructions, when microprocessor 15 determines that the preprogrammed time has elapsed between transmissions, it initiates the transmission sequence by providing an input to modulator 20. This input consists of a coded series of pulses which turn modulator 20 on and off as described hereinbelow. Modulator 20 consequently applies power and removes power alternately to oscillator 25. Oscillator 25 generates the appropriate microwave frequency when power is applied. This modulated microwave frequency, signal 12, is then transferred by appropriate wave guide as is well known in the art to antenna 11. Antenna 11 is typically a directional horn antenna as is well known in the microwave communications art, but may also be designed to more broadly transmit signal 12 if desired for specific applications. The instructions for controlling microprocessor 15 are of a simple format, readily recreated by one skilled in computer programming.

Transmitter 10 may be powered by battery 32 or directly by a source of commercial power (not shown). Battery power is preferred so that the Electronic Billboard may operate independently of commercial power. Battery 32 must have sufficient capacity to operate the system through the longest expected period when external power for recharging will be unavailable. Battery 32 may be recharged by any convenient battery charging device 34. Solar power cells are the preferred source to make Billboard System 100 power-independent, but commercial power may be used to recharge battery 32. If commercial power is utilized directly, it would be necessary to add to the transmitter an appropriate alternating current (AC) to direct current (DC) power converter as is also well known in the art.

With continuing reference to FIGS. 2 and 3, battery 32 powers microprocessor 15 and single-board controller 26. Microprocessor 15 stores preprogrammed instructions 14 in its memory. Controller 26 may be, for example, a model RTC180, manufactured by Micromint, Inc., or any other suitable microprocessor controller system with a hardware interrupt.

Battery 32 also provides power to adjustable voltage regulator 36 which is set to provide the proper voltage for cavity-tuned, Gunn-diode 25 to oscillate. Adjustable voltage regulator 36 may be any of several types commonly available, such as an LM317T manufactured by National Semiconductor. Voltage regulator 36 provides the correct voltage for oscillator 25 as specified by the oscillator manufacturer.

The combination of resistor 22 and resistor 24 form a voltage divider between the output pin of voltage regulator 36 and the adjustment pin of said regulator. This sets the output of voltage regulator 36 for the proper voltage required by each Gunn diode oscillator 25. Resistor 22 may be a variable resistor which is adjusted in final production testing or it may be a fixed resistor if the diode oscillators are preselected to be within a tolerance required for proper operation with the single selected fixed drive voltage. When controller 26 commands transmitter 10 to turn-off via output port 30, transistor 23 acts as a switch to short circuit resistor 22. This causes the output of voltage regulator 36 to drop to its minimum value which is below the oscillation voltage required by oscillating diode 15. Transistor 23 may be of nearly any type of NPN switching transistor such as a 2N2222. Capacitor 21 is recommended by the manufacturer and is believed to be needed in some applications to reduce the possibility of spurious oscillation of voltage regulator 36. Capacitor 21 is recommended by the manufacturer of some cavity-tuned Gunn diode oscillators such as M/A-COM, Inc. for use with their part number MA86790 K-band oscillator directly across the terminals of the oscillator.

Oscillating diode 15 is connected by means of a waveguide suitable for the frequency utilized to directional antenna 11. Antenna 11 may be of any type as is well known in the art, such as M/A COM Inc. part number MA86552 horn antenna. Signal 12 is then emitted from antenna 11 as pulses of microwave energy.

Figure 4A:
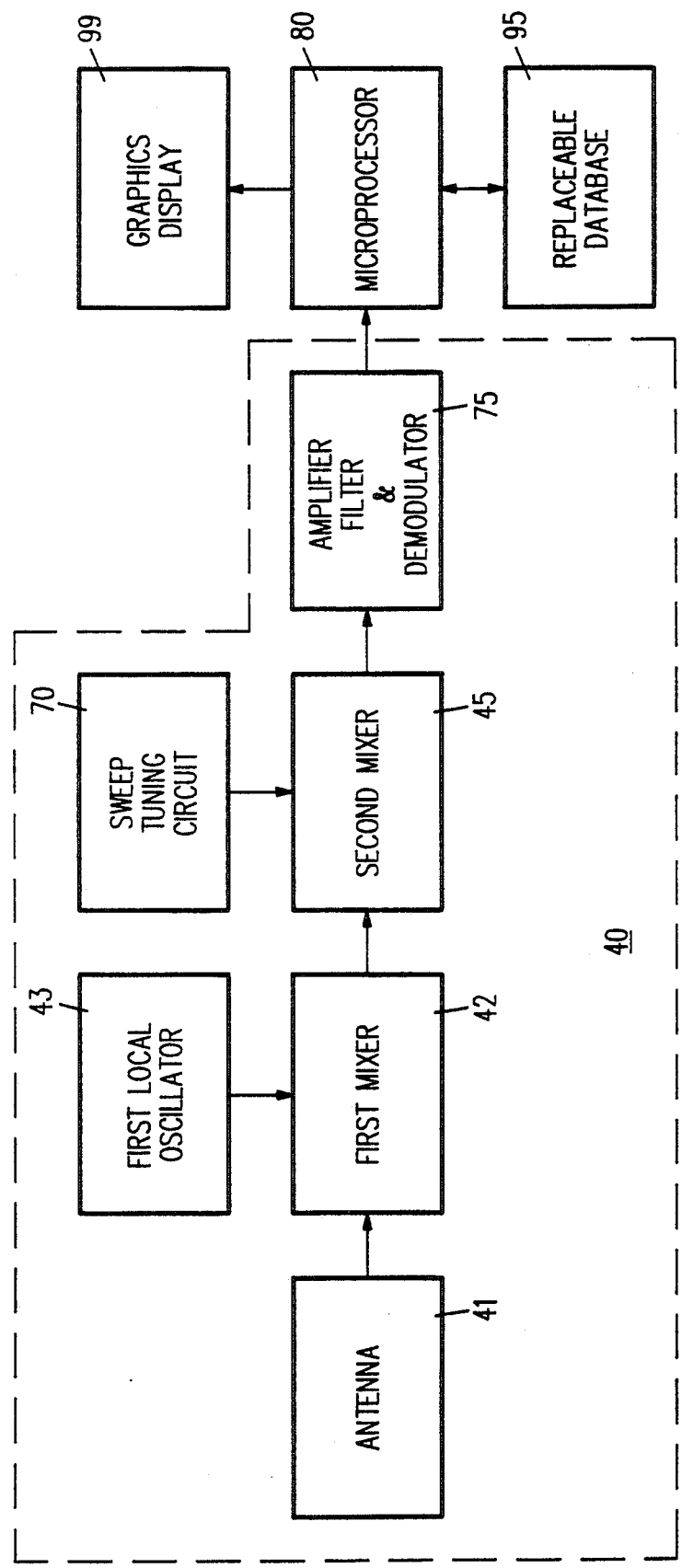
FIG. 4A is a simplified block diagram of the receiver of the system of FIG. 1.
Figure 4B:
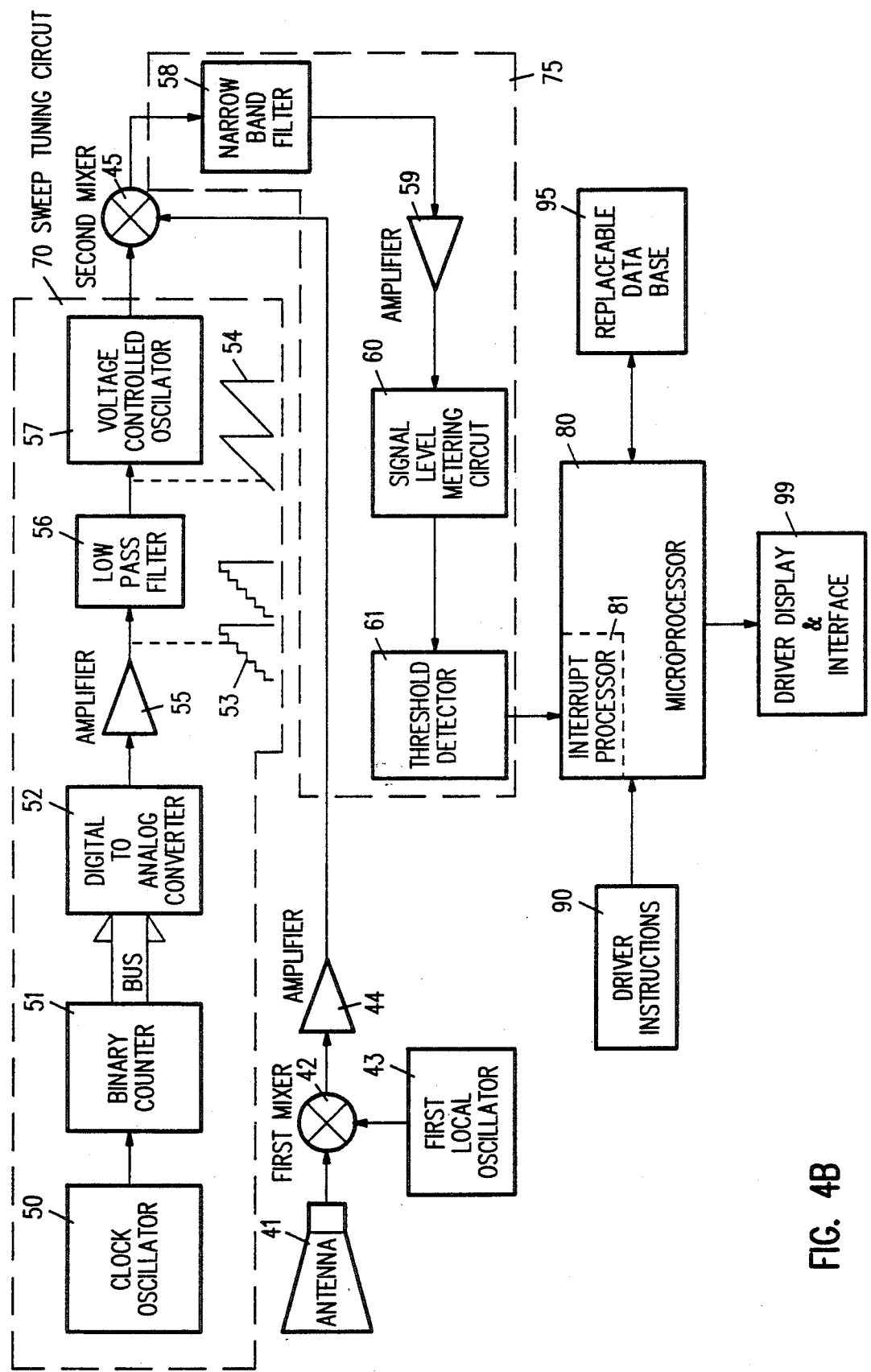
FIG. 4B is a detailed block diagram of the receiver of FIG. 4A.
Figure 5:
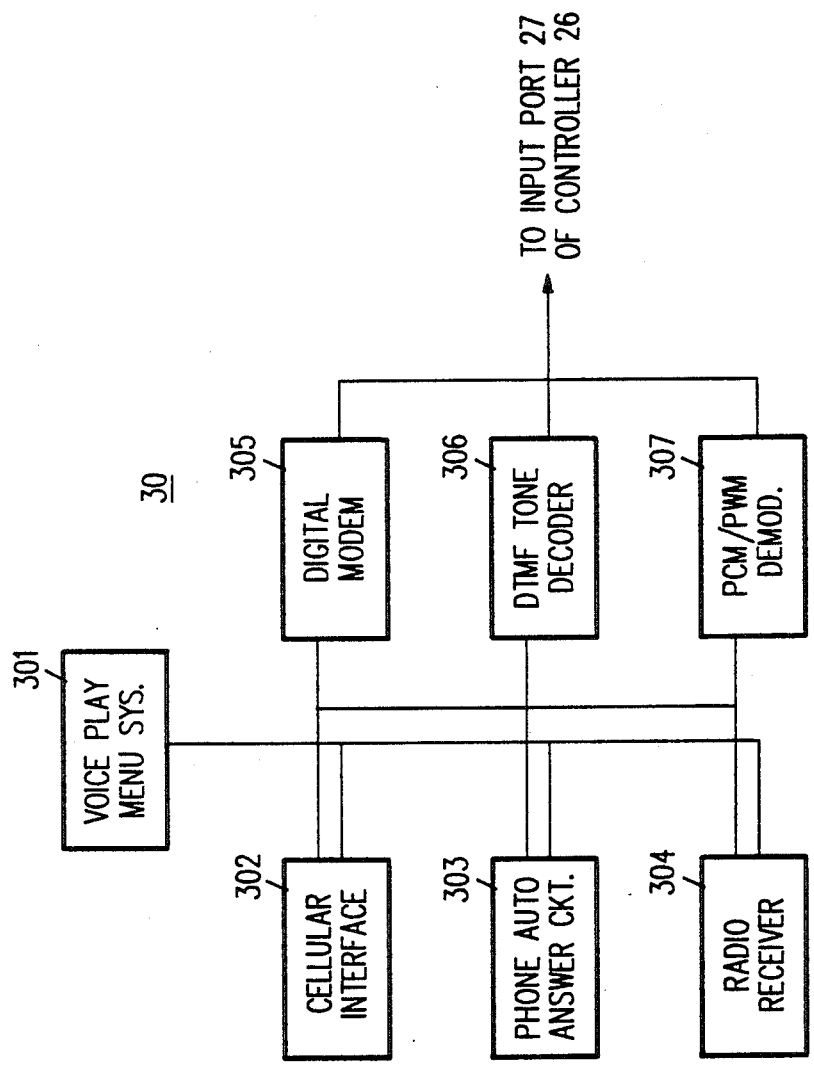
FIG. 5 is a block diagram of a remote interface for use with the transmitter of FIG. 2.

Referring now to FIGS. 4 and 5, the essential elements of receiver 40 are shown. Receiver 40 is a dual conversion superheterodyne receiver which is well known in the art. Receiver 40 is designed to sweep tune approximately 150 MHz around the expected center frequency of transmitter 10 in order to maintain a narrow bandwidth while still receiving all signals. This sweep tuning allows receiver 40 to distinguish between multiple transmitters, even if they are transmitting simultaneously. The construction of microwave receivers is well known; for example the commonly available police radar detectors such as the Escort receiver manufactured by Cincinnati Microwave.

Receiver 40 works in consonance with microprocessor 80 to decode signal 12 and present the desired information to the driver. By sampling signal 12 several times during each pulse period, receiver 40 is assured of receiving all signals and properly interpreting them as digital bits for decoding by microprocessor 80. Microprocessor 80 may be of any type readily available and preferably contains a random access memory (RAM) section for use by microprocessor 80 program instructions. Receiver 40 and the associated devices are installed in the driver's vehicle.

Antenna 41 receives signal 12 which is processed by a first mixer 42, a first local oscillator 43, a second mixer 45, an amplifier, filter and demodulator section 75 and microprocessor 80. This process is described more fully hereinbelow.

Received signal 12 is downconverted to a more easily manipulated frequency by first mixer 42 and first local oscillator 43 in a manner well known in the art. The transformed signal is then amplified by amplifier 44 and conducted to second mixer 45. Second mixer 45 utilizes saw-tooth shaped drive voltage 53 from sweeping tuning circuit 70 to form an intermediate signal 54 in a manner well-known in the art. Intermediate signal 54 is then filtered and amplified by amplifier, filter and demodulator section 75 for presentation to microprocessor 80.

Sweep tuning circuit 70 provides a variable signal to second mixer 45. Sweep tuning circuit 70 consists of the essential components shown in FIG. 4B. Auxiliary components such as resistors and capacitors will be required as determined by the manufacturer's specific component chosen to implement each function. Voltage controlled oscillator 57 is swept in frequency by the control voltage produced by clock oscillator 50. Clock oscillator 50 may be any of several devices such as TD308C manufactured by NDK. Clock oscillator 50 drives binary counter 51 which in turn controls the output of digital to analog converter 52. Binary counter 51 may be of any type such as 74HC590, and converter 52 may be of any type such as DAC0808, both of which are manufactured by National Semiconductor. Drive voltage 53 from converter 52 is amplified by amplifier 55 and then smoothed by low-pass filter 56 into intermediate signal 54 which drives oscillator 57. Amplifier 55 may be of any type such as an LM741 manufactured by National Semiconductor and filter 56 may be of any passive or active type designed in a manner well known in the art.

The choice of specific operating components as described above will determine what auxiliary external components such as resistors and capacitors are necessary to complete sweep tuning circuit 70. The detailed design of voltage controlled oscillator 57 may vary in accordance with the electronics design art, as long as the design allows for voltage controlled oscillator 57 to sweep at least 150 MHz around the second intermediate center frequency.

The smoothing of saw-tooth drive voltage 53 is desirable to avoid the introduction of very high frequency step functions into oscillator 57, which may cause spurious oscillations. The output of second mixer 45 is fed to narrow band filter 58 which filters out noise inputs that are outside the bandwidth of receiver 40. Output is then fed to amplifier 59 and then to signal level metering circuit 60. Circuit 60 provides a varying level signal to threshold detector 61 which is proportional to the signal level of the detected energy in signal 12. The functions of filter, amplifier and demodulator section 75 may be provided by a single integrated circuit such as an LA1140, manufactured by Sanyo and commonly used in automotive radio receivers and radar detectors.

Threshold detector 61 provides an interrupt to microprocessor 80 through interrupt processor 81 whenever sufficient energy from transmitter 10 is detected. Operating under software instructions as described hereinbelow, microprocessor 80 examines the pattern of the interrupts to decode the message and process it for display according to driver instructions 90. Microprocessor 80 uses the decoded message as an address to look up the complete message content within replaceable database 95 and send the complete desired information to driver display and interface 99. Messages may also be composed by microprocessor 80 by linking of partial messages within database 95 in appropriate sequences as indicated by the sequence of codes within encoded signal 12.

Replaceable database 95 may be of any type of rapid random access mass data memory storage device common in the computer memory art. Devices such as laser disks, high density diskette or plug-in modules which can be easily changed by the operator following simple instructions are preferred. Replaceable database 95 may be recorded in one or more languages, either on one device or each of several devices to allow the operator to select a preferred language for message display. Periodic updates of the data in replaceable database 95 may be provided, for example by a subscription service.

Driver display and interface 99 may be of any type as is known in the art. The preferred means of displaying the message to the driver is by audible signal, allowing the driver to watch the road and traffic while receiving the requested information. It is also desirable for driver display and interface 99 to contain a visual display capability to which the driver may refer as desired. A provision to replay the last or several of the last messages may also be desirable. Other types of data display devices, such as "heads-up" projection onto the windshield, may be utilized for example, as an extra-cost option.

Referring again to FIG. 1 and further to FIG. 5, as an added feature to enhance the system capability, remote interface 30 may be added to transmitter 10 for interactive updating of the preprogrammed instructions 14 in microprocessor 15. Remote interface 30 preferably consists of interconnected components such as voice play menu system 301, cellular interface 302, telephone automatic answering circuit 303, radio 304, digital modem 305, dual tone multiple frequency (DTMF) decoder 306, and pulse code or pulse width (PC/PW) demodulator 307, all of which connect to controller 26 of transmitter 10. The design of these components is well known in the art and does not form an essential part of the present invention. Additional interface components for remote interface 30 to receive information from emergency vehicle instructions 31, central control instructions 37 and real-time sensors instructions 39 may be added as necessary for other specialized communications methods.

Cellular interface 302 allows the receipt of messages from an automatic cellular telephone. Cellular interface 302 would be used to interface transmitter 10 to an automatic cellular telephone system where the need for direct connection to the landline telephone system is not required or not practical.

Telephone automatic answering circuit 303 connects transmitter 10 to the landline telephone system when it is desired or convenient to use it. Circuit 303 would recognize the high voltage ringing signal present on the landline when a user dials the telephone number assigned to transmitter 10, and automatically answer the call in a manner similar to other telephone answering machines.

Radio 304 may be used with any variety of other special-function wireless systems utilizing unique transmitters and frequencies. It may be necessary to include a tone coded recognition signal for use in identifying and validating authorized users.

Digital modem 305 would interface internally to either cellular interface 302 or telephone automatic answering circuit 303 to accept digitally encoded signals that would be transmitted by a modem-equipped computer user. This would be the most efficient use of the interface link in terms of data exchange rate. If digital modem 305 does not automatically synchronize with the modem-equipped computer user, voice play menu system 301 would provide a verbal menu to the user for the user to make desired inputs.

DTMF tone decoder 306 receives and processes tones from tone-encoder equipped telephone sets through either cellular interface 302 or telephone automatic answering circuit 303, or from radio 304. The tone encoded signals are decoded by DTMF toner decoder 306, translated into appropriate signals and transmitted to controller 26 of transmitter 10.

PCM/PWM demodulator 307 receives and processes digital radio signals from radio 304. PCM/PWM demodulator 307 then transfers the appropriate signals to controller 26.

Voice play menu system 301 would provide voice playback to the user through cellular interface 301, telephone automatic answering circuit 303 or radio 304 in order to give instructions or a verbal menu to the user for the user to make desired inputs.

Controller 26 may be configured to communicate messages to external users via remote interface 30 when such messages are desired for information collection or feedback on selections accepted by controller 26. Other uses for such feedback messages are maintenance or status data transfer. With the exception of DTMF tone decoder 306, all interface modules are reciprocal path devices as is common in the art. The communication path for information back to a user is the reverse of the receiving data path.

Remote interface 30 allows selected portions of the message to be changed. For example, restaurants or gas stations may update service availability or motels may update vacancy information. This capability would allow users such as advertisers or emergency officials, police for example, to update the encoded message from a specific transmitter for current information.

The addition of remote interface 30 would further allow Billboard System 100 to be updated in real-time by a central control agency, for example the state police or other emergency response agency. Insertion of emergency codes into microprocessor 15 of transmitter 10 may allow the communication to all motorists of specific safety related or other information in the language selected by each driver.

Remote interface 30 also allows the real-time update of Billboard System 100 with information from remotely located sensors placed anywhere in the roadway system. Such sensors may, for example, detect roadway icing conditions, unusually heavy or slowly moving traffic, or other safety related information. Microprocessor 80 may be instructed to synthesize a variety of safety related messages for example in response to coded input from such remote sensors.

Figure 6:
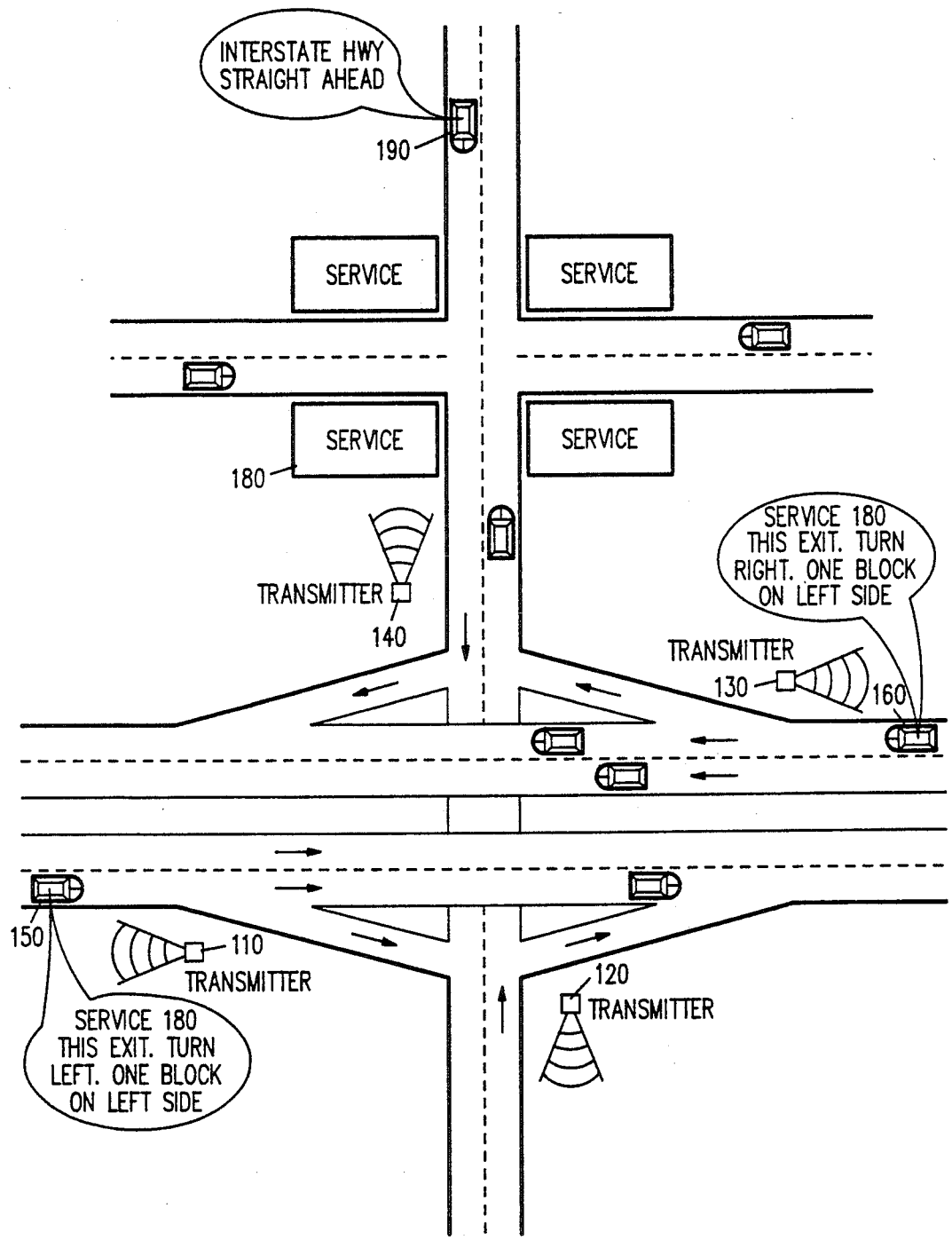
FIG. 6 is a diagram of a typical installation configuration of the system of FIG. 1.

Referring now to FIG. 6, a typical roadway installation is shown. Transmitters 110, 120, 130 and 140 are located near a major intersection. The directional antenna 11 of each transmitter is oriented toward one direction of approach to the intersection by vehicles on the roadway. For more complex intersections more transmitters may be used. In use, for example, transmitter 110 sends its encoded messages to vehicle 150 as it approaches the off ramp of the intersection. The encoded message is decoded by a receiver in vehicle 150 and the driver is presented with a message, such as direction to service number 180 about which the driver has requested information. At approximately the same time, transmitter 130 is transmitting an encoded message to vehicle 160 which is decoded by a receiver in vehicle 160 and the driver is presented with a similar but different message such as direction to the same service number 180 which the second driver has also requested information about. Similarly, transmitter 140 provides a message to vehicle 190 which is decoded by a receiver in vehicle 190 and the driver is presented with different information which he had requested. Transmitters 110, 120, 130 and 140 will each transmit at periodic intervals determined by the preprogrammed instructions 14, and remotely received instructions 31, 37, or 39 if applicable, installed in them. Each transmitter transmits all the message codes that are inserted into them, without regard for whether or not there is a potential receiver in the area. The receiver in each vehicle will automatically sort through the message codes for information that is desired by the driver of that vehicle.

Figure 7A:
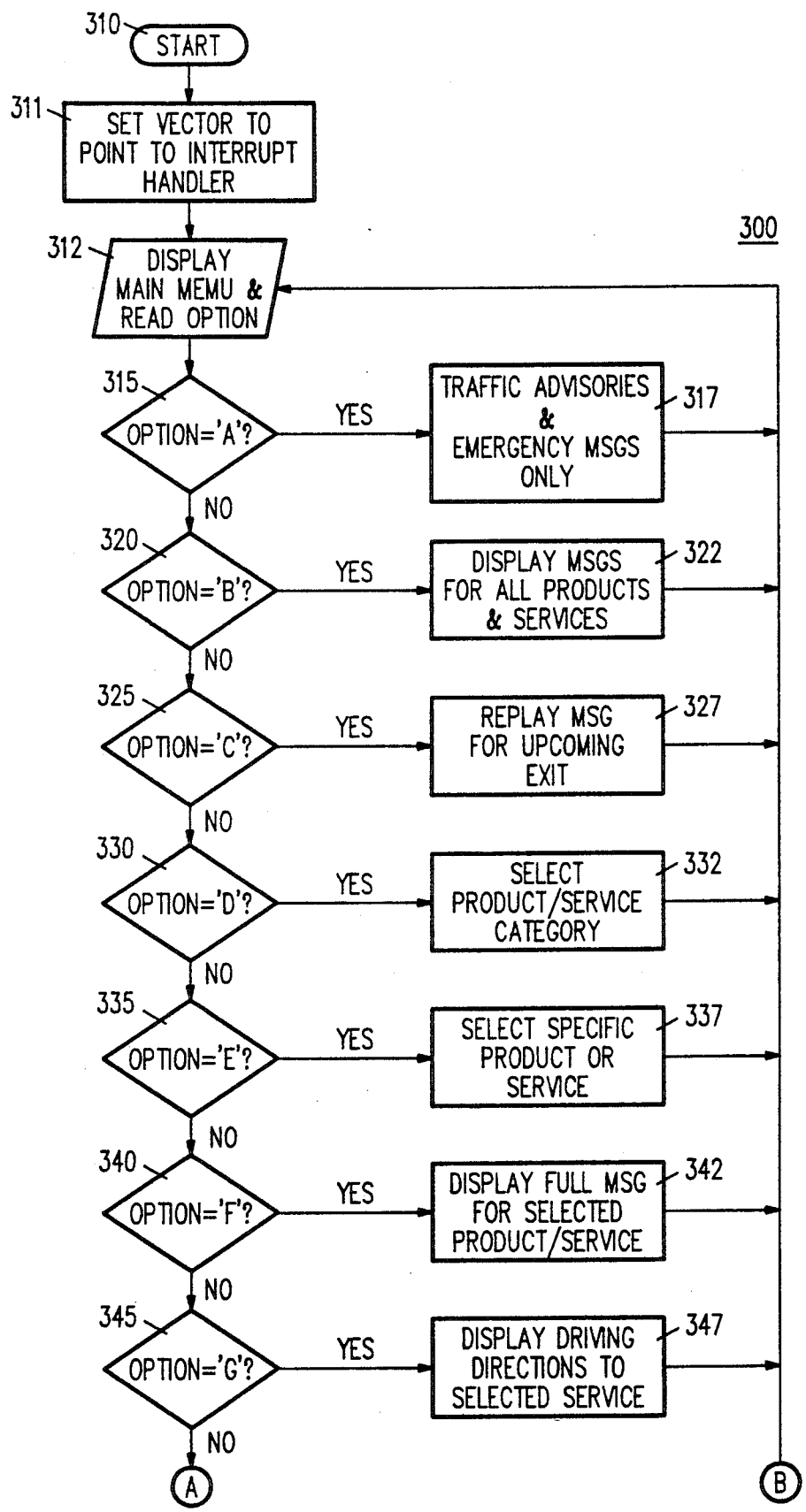
FIGS. 7A and 7B are a logic flow diagram of the main program for control of the receiver in the system of FIG. 1.
Figure 7B:
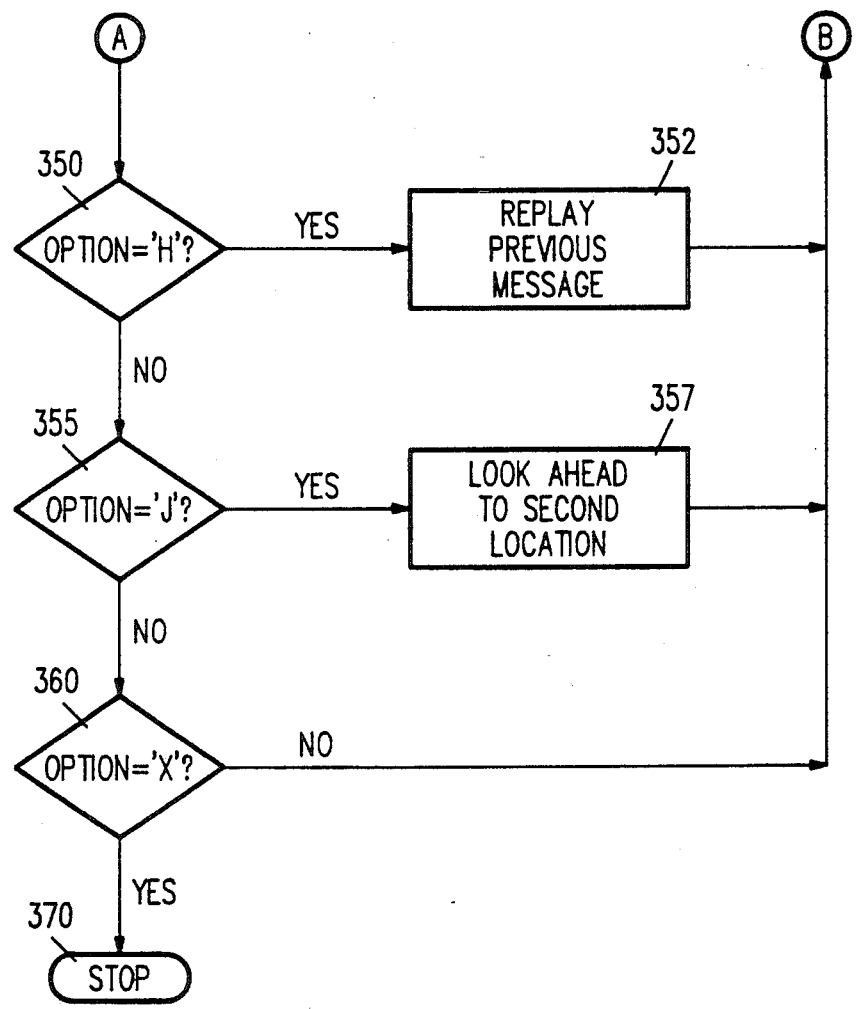
Figure 8A:
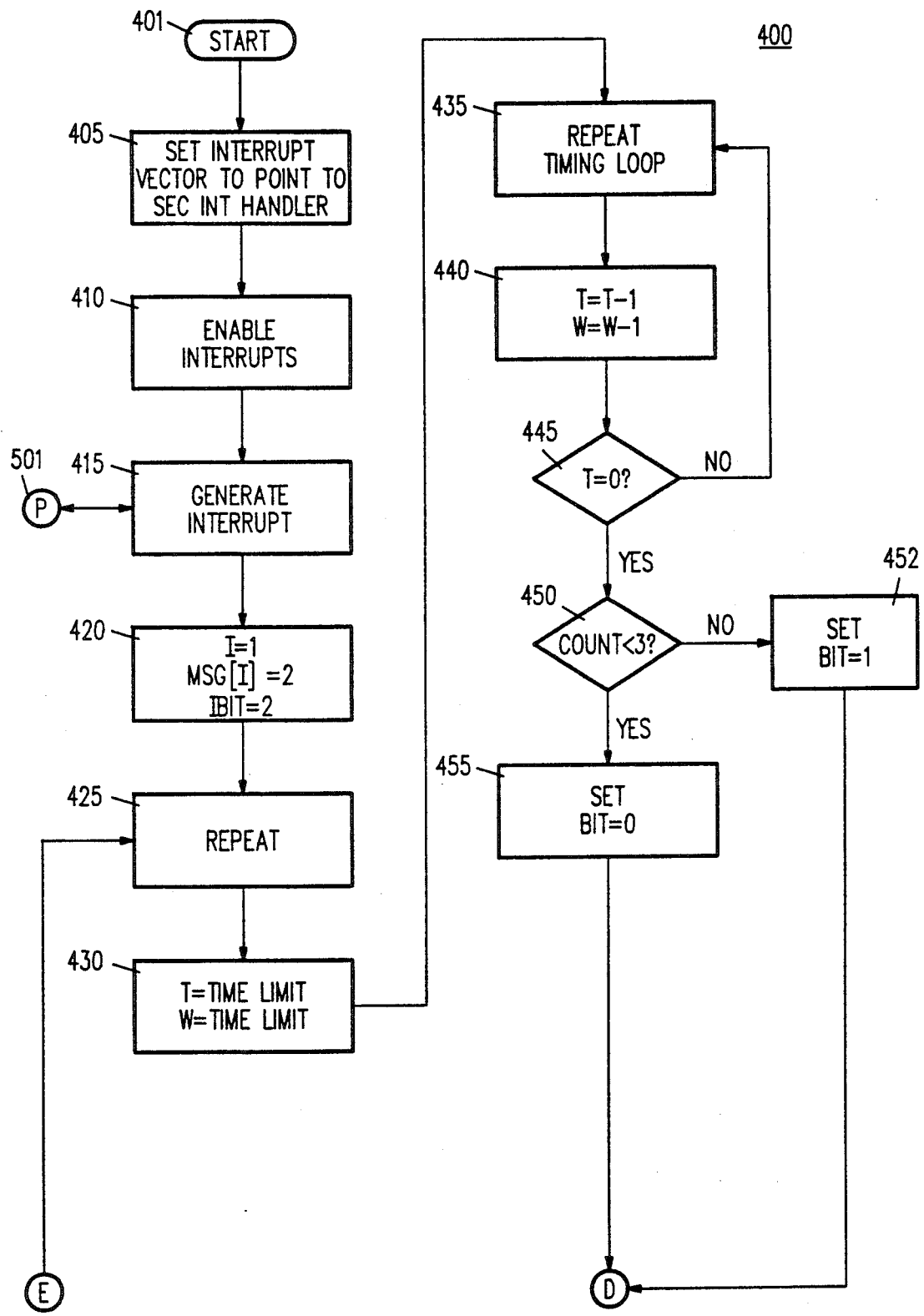
FIGS. 8A and 8B are a logic flow diagram for the main interrupt handler program utilized by the main program of FIG. 7.
Figure 8B:
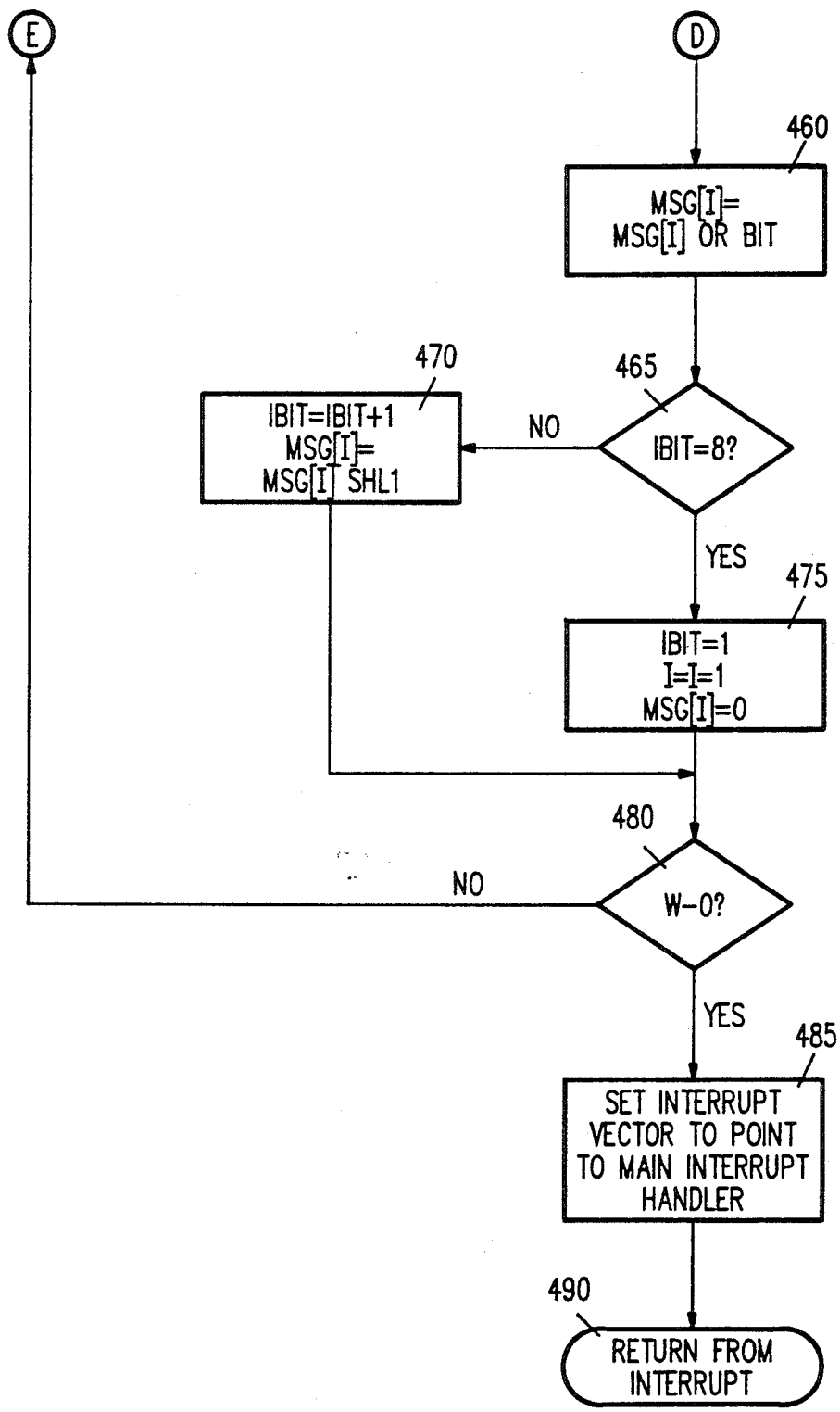
Figure 9:
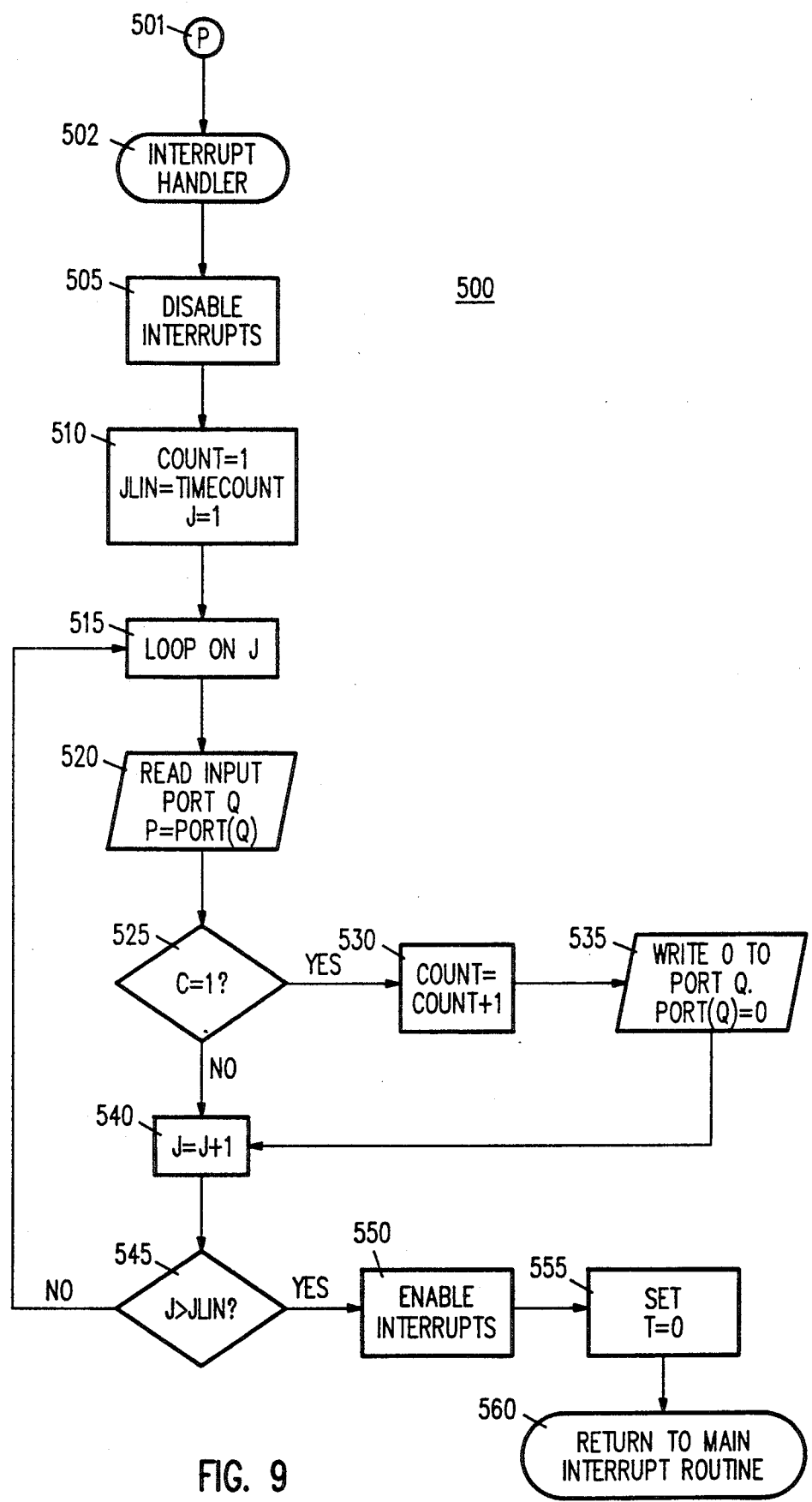
FIG. 9 is a logic flow diagram for the secondary interrupt handler program utilized by the main program of FIG. 7.

System operations are controlled by microprocessor 80 in accordance with the flow diagrams depicted in FIGS. 7 through 9. The system offers a variety of options to the driver. The option selection is menu driven to minimize driver interactions. The Billboard System offers the driver options such as traffic advisories only, all products and services at the next exit, some products or services at the next exit, driving directions, etc. These options are represented in FIG. 7 as options A through X. In practice, the number of options is limited only by the complexity of the driver interface device used, the cycle time available to microprocessor 80 and data storage capacity.

The control instructions which compose the main program consists of a variety of subroutines which piece together the received message, extract the desired information from the received codes and from database 95 and present the requested information to the vehicle operator. Because of the way the transmitted message is coded, packed and stored, extensive bit operations (such as shift left, shift right, and, or) are required to extract the desired information. Those operations, and the operations required to implement the options discussed above, are straight forward and easily reproduced by a person skilled in the art of computer programming. Therefore these subroutines are not disclosed in this specification and form no part of the present invention.

Referring now to FIGS. 7 through 9, the program processes program interrupts to produce a sequence of zero or one bits, decodes the message, compares the incoming message to the last message and stores the message in an internal volatile random access memory of microprocessor 80 if the program determines that the message is new. The program then alerts the driver at driver display and interface 99 that a new message was received. Depending on driver instructions 90, the received message will be displayed in whole or in part, or retained in memory. If the driver wishes to have additional information about one of the products or services available at the upcoming exit, microprocessor 80 will use the identification code of the desired product or service to search database 95. The information stored in database 95 will provide the name of the product or service, and could also provide a description, jingle or logo if so instructed by the main program. This processing is described in greater detail below.

Figure 10:
FIG. 10 is a typical encoded transmitted message sequence of the system in FIG. 1.
Figure 10:
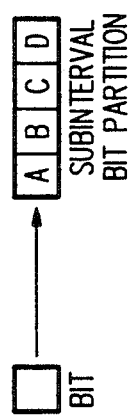

Referring now to FIG. 10, a typical transmitted message sequence is shown. Each box represents a zero or one bit. The transmitted message may be composed of any number of bits desired. Receiver 40 partitions each bit interval into four subintervals, represented here as A, B, C, and D. Receiver 40 will always interrupt microprocessor 80 during the first subinterval, A. This signals the beginning of a bit processing period and provides timing calibration for the algorithm. Receiver 40 then generates an additional one to three interrupts during the remainder of the three subintervals, depending on whether the received bit is a zero or one. In addition to generating interrupts, receiver 40 places a zero or one bit on interrupt processor 81 of microprocessor 80. Microprocessor 80 need only count the number of one bits placed on interrupt processor 81 during a bit interval to determine if the transmitter bit is a zero or a one. If the count is one or two, the bit is interpreted as a zero; if the count is three or four, the bit is interpreted as a one.

With reference again to FIG. 7, the information sequence of the main program is shown. Receipt by receiver 40 of the first interrupt as described hereinabove initiates main program 300. The program sets operation 311 to point to the interrupt handler. The program then advances to operation 312 to activate the main menu display and read option. When operation 312 is set, the program proceeds to operation 315. Operation 315 may be, for example, driver instructions to display traffic advisories and emergency messages only. If operation 315 is selected, the program selects operation 317 and returns to operation 312. The driver would receive only the selected messages on driver display and interface 99.

If operation 315 is not selected, the program progresses to operation 320. If operation 320 is selected, representing for example driver instructions to display all messages, operation 322 directs microprocessor 80 to display all messages at driver display and interface 99 and the program again returns to operation 312.

In a similar manner, the program progresses through operations 325, 330, 335, 340, 345, 350, 355, and 360, each time proceeding to either the indicated corresponding operation 327, 332, 337, 342, 347, 352 or 357, and subsequently returning to operation 312, or progressing on to the subsequent program operation. The number of operations may be varied to suit the intended application. Upon reaching the final logic block, here represented by operation 360, the program returns to operation 312 or stops the sequence at 370.

Referring again to FIGS. 8 and 9, the logic and information flow for the two interrupt handlers is shown. Main interrupt handler 400 is called by main program 300 whenever the first interrupt of a new message is placed on microprocessor 80. Interrupt 400 is responsible for processing the entire message. Secondary interrupt handler 500 accomplishes the bit subinterval processing to determine the value of each bit. These processes are described further elsewhere in this specification.

Referring again to FIG. 8, when interrupts are received at interrupt processor 81, microprocessor 80 completes the present instruction cycle, saves the value of the current instruction pointer and values of the flags and registers on the stack, disables further interrupts and jumps to the interrupt handling routine pointed to by an interrupt handling vector. As shown in FIGS. 8 and 9, main interrupt handler 400 will reset interrupt vector operation 405 to point to the secondary interrupt handler and cause operation 410 to enable further interrupts. Main interrupt handler 400 will then instruct operation 415 to generate a program interrupt of the same type as that caused by receiver 40. This will cause secondary interrupt handling routine 500, shown in FIG. 9, to be executed. This is indicated by access point 501, P, in FIGS. 8 and 9. The execution of secondary interrupt handling routine 500 is discussed hereinbelow. For purposes of the explanation of main interrupt routine 400, assume that secondary interrupt handler 500 returns with a count of the number of interrupts (one, two, three or four) that receiver 40 places on microprocessor 80 during microprocessor 80's processing of a bit period. Furthermore, secondary interrupt handler 500 always returns with time limit T from operation 555, set to zero.

Main interrupt handler 400 initializes the first byte of the message (hereinafter referred to as "MSG[1]"), and the values of two indices, "I" and "IBIT". I is an index for the MSG array pointing to the ith byte, and IBIT is a counter to indicate which bit within a byte is being processed. Main interrupt handler 400 will then enter a processing loop indicated in FIG. 8A by operation 425, REPEAT. Main interrupt handler 400 will then instruct operation 430 to set two index variables equal to TIMELIMIT, the value of which is determined so that a program timing loop will have a duration of five milliseconds. The purpose of this timing loop is to signal when a message has ended. This ending is indicated by the absence of any interrupts for a period of time. The duration of five milliseconds is typical; any value greater than one millisecond should be sufficient. The interior timing loop times out based only on the value of the variable T. Because secondary interrupt handler 500 always returns with T equal to zero, any interrupts received during the processing of the internal timing loop will cause the program to exit the timing loop each time an interrupt occurs. Main interrupt handler 400 will then instruct operation 450 to determine if the value of BIT should be zero or one based on the value of COUNT. If COUNT is three or four, BIT is set to one by operation 452; otherwise BIT is set to zero by operation 455. Main interrupt handler 400 will then instruct operation 460 to OR the previous value of MSG[1] with the new BIT value. Based on the value of IBIT, main interrupt handler 400 will then instruct operation 465 to determine if the present bit is the 8th bit in a byte. If so, operation 475 sets IBIT to one; increments the byte counter one, and initializes the next byte value, MSG[1] to zero. If the present bit is not the 8th bit of a byte, operation 470 increments IBIT and prepares MSG[1] for the next bit by shifting the bits one position to the left.

Main interrupt handler 400 then instructs operation 480 to determine if the second timing index, W, is equal to zero. If so, that means the interior loop was exited because of a time out and operation 485 resets the interrupt vector to point to the main interrupt handler, restores flags and registers from the stack, enables interrupts, and returns via operation 490 to main program 300 to continue processing at the point where the initial interrupt occurred. In this case, the time out means that the message has ended. If timing index W is not equal to zero, that means the interior loop was exited because an interrupt was received during processing. In this case then W is not equal to zero, there may be additional bytes in the message. Therefore, interrupt program 400 returns to outer REPEAT operation 425 for processing of the next bit.

Referring now to FIG. 9, the operation of secondary interrupt handler 500 is shown. The purpose of secondary interrupt handler 500 is to process a single bit. Secondary handler 500 begins by instructing operation 505 to disable additional interrupts and initialize counter 510, COUNT, to one and a timer index J to one. The program then enters at operation 515 a timing loop which typically has a duration of between 0.78 and 0.85 milliseconds. The duration of this loop is determined based on the value of the constant JLIM. During each loop the program will instruct operation 520 to read the value placed on access point 501, input port Q, by receiver 40. If operation 525 determines the value of C is equal to one, COUNT is incremented by operation 530 and a zero value is written to port Q by operation 535. If operation 525 determines the value of C is not equal to one, the timing loop index J is incremented by one by operation 540. If J is less than or equal to JLIM as determined by operation 545, program execution returns to the beginning of the loop at operation 515 and continues. If J is less than JLIM, operation 550 enables interrupts and instructs operation 555 to set the global variable T to zero. Secondary interrupt handler 500 then returns to main interrupt handler 400 with the values COUNT and T.

The value of JLIM set by operation 510 will depend on the type and speed of microprocessor 80 and on the actual number of instruction cycles which comprise the loop. The value of JLIM will be determined experimentally by trial and error to generate the desired timing. Further, the actual duration of the timing loop will depend on the number of ones read from input port Q at access point P. However, since there can be a maximum of three additional ones during the loop, the timing error will be minimal and will have no effect on the results.

Figure 11:
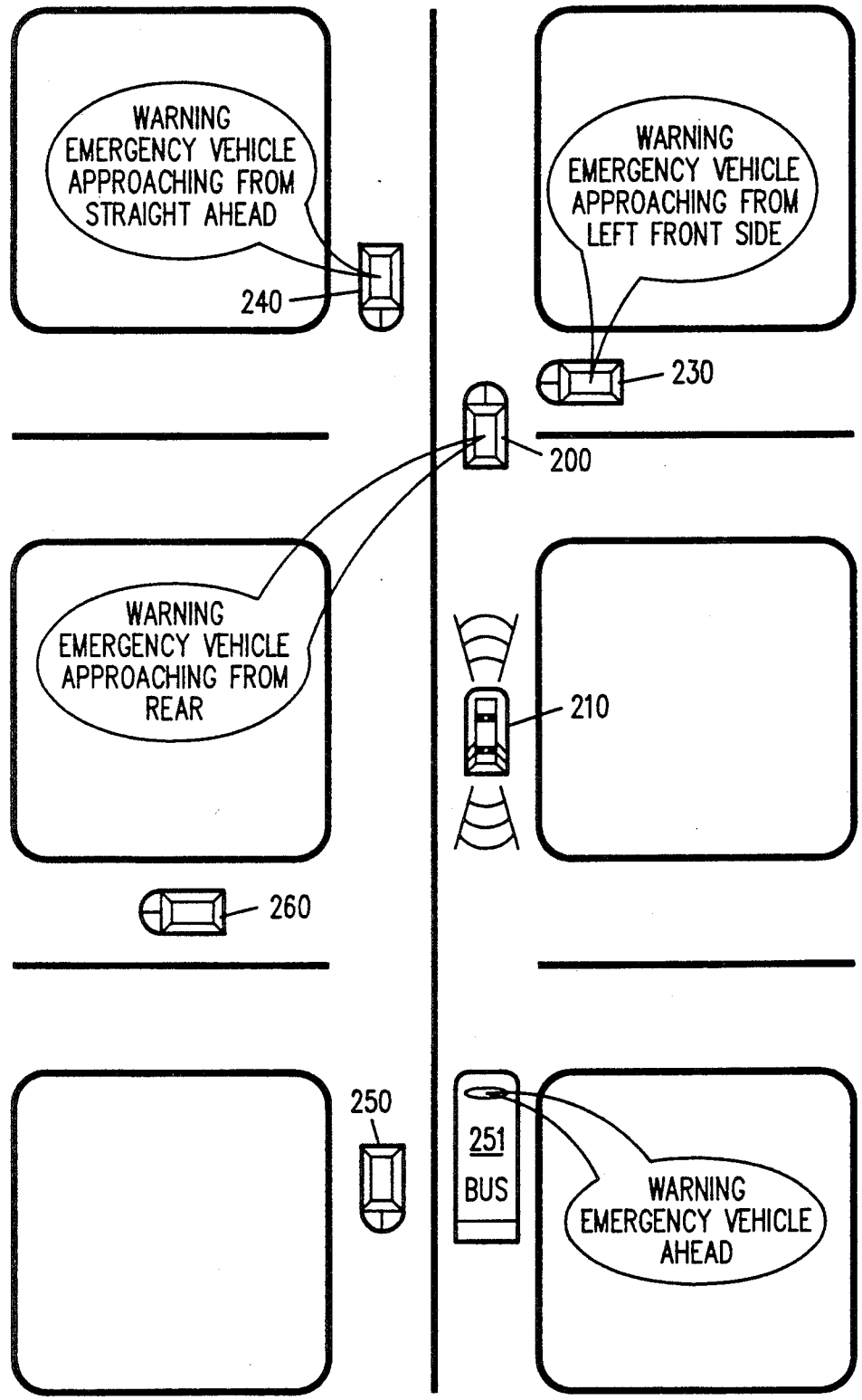
FIG. 11 is a diagram of an installation configuration for the emergency vehicle warning feature of the system of FIG. 1.

Referring now to FIG. 11, an additional application of the Billboard System is shown. A transmitter may be installed in emergency vehicle 210 such as a police car, fire truck or ambulance. The transmitter may use several directional antennas or an omnidirectional antenna to transmit to approaching or receding vehicles. Vehicles 200, 230, 240 and 250 will each receive the same encoded signal. Receivers in each vehicle will decode the signal and process it into an appropriate warning message depending on the direction of approach to vehicle 210. Vehicle 260 will also receive the same signal but not decode it beyond determining that vehicle 260 is traveling away from emergency vehicle 210.

The determination of direction of travel relative to vehicle 210 is made by polling by each receiver to determine relative signal strength of the signal supplied by vehicle 210 antennae. The use of several directional antennae on vehicle 210 and appropriate encoding for each would simplify the polling function of the receivers in vehicles 200, 230, 240, 250 and 260. The details of polling circuit design are well known in the art and are not necessary to understanding this application of the Billboard System.

Figure 12:
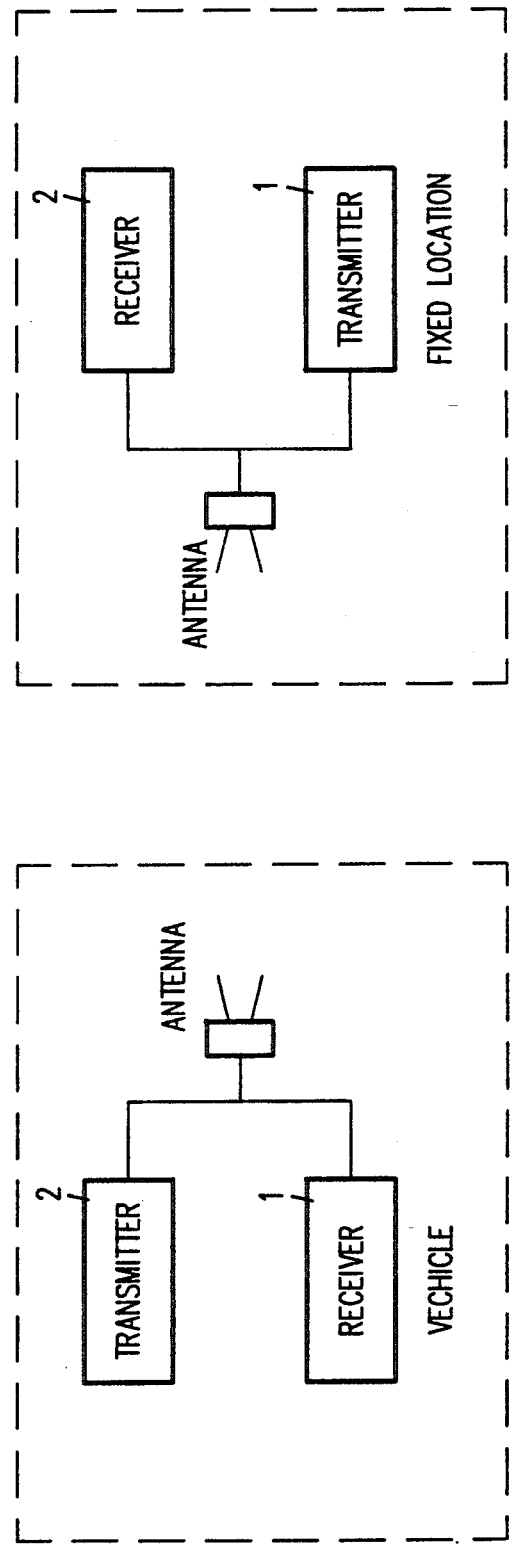
FIG. 12 is a block diagram of the system of FIG. 1 for applications involving a two-way radio communications link.

Other features and applications of the present invention are also possible. For example, with reference to FIG. 12, the addition of a transmitter in the vehicle and a receiver associated with the fixed roadway transmitter of Billboard System 100 as described hereinabove would allow for two-way communication for such applications as automatic toll collecting or fleet vehicle management. These applications may utilize unique codes representing vehicle identification and would allow for automated information transfer between vehicles and selected receiver locations.

Another application may be a localized system for automated tours of museums, galleries or parks for example. This application would allow the user to determine his own order of passage through the facility and still receive correct information for the position in which the transmitter is located.

These and other applications, including military and convert users, are possible by designing databank 95 for the specific application. The details of data design need not be addressed here as data structuring and compilation is well known in the art.

The present invention has been particularly shown and described with respect to certain preferred embodiments thereof. However, it should be readily apparent to those of ordinary skill in the art that various changes and modification in form and details may be made without departing from the spirit and scope of the invention as set forth in the appended claims.

We claim:

1. A communications system for communicating with operators of motor vehicles travelling along roadways, said system comprising:

at least one transmitter disposed along a roadway for intermittently transmitting short bursts of signals within a band of frequencies to reduce the duty cycle and to permit operation of a plurality of transmitters within the same band of frequencies, said signals, being transmitted according to a predetermined cycle;

said transmitter having an antenna, a first microprocessor and a first storage means coupled thereto for storing program instructions used by said first microprocessor to control encoding and modulation of a carrier frequency which is transmitted through the antenna as said short bursts of signals, said program instructions also controlling said predetermined cycle;

a plurality of receivers including sweep tuning means for sweeping across said band of frequencies until said short bursts of signals are received, each of said receivers mounted in one of said motor vehicles for receiving said signals from said transmitter;

each of said plurality of receivers having a second microprocessor and mass storage means coupled thereto, said second microprocessor functioning to decode said short bursts of signals to form a decoded message, said decoder message being used by said second microprocessor as an address for retrieving a group of messages from said mass storage means, said group of messages being comprised of a plurality of selected messages;

input means coupled to said second microprocessor for allowing a vehicle operator to designate a message option parameter, said message option parameter being used by said second microprocessor to select at least one of said selected messages from said group of messages for presentation to said vehicle operator as a displayed message; and display means coupled to each of said receivers for presenting said displayed message to said vehicle operator.

2. A communications system as in claim 1 wherein the sweep tuning means comprises a voltage controlled oscillator and a clock oscillator for producing a control voltage for controlling said voltage controlled oscillator.

3. A communications system as in claim 1 wherein said carrier frequency is in the microwave range (10 GHz to 35 GHz).

4. A communications system as in claim 1 wherein said short bursts of signals include codes identifying commercial messages contained in said mass storage means.

5. A communications system as in claim 1 wherein said short bursts of signals include codes identifying traffic hazard information contained in said mass storage means.

6. A communication system as in claim 3 wherein said transmitter antenna is a directional horn antenna.

7. A communications system as in claim 1 wherein said transmitter includes interface means suitable for communicating with remote communications means.

8. A transmitter as in claim 7 wherein said remote communications means comprises a telephone.

9. A transmitter as in claim 8 wherein said remote communications means comprises a cellular telephone.

10. A transmitter as in claim 7 wherein said remote communication means comprises a radio.

11. A communications system as in claim 1 wherein said mass storage means contains messages in more than one language.

12. A communication system as in claim 1 wherein said transmitter are coupled to at least one real-time sensor.

13. A communications system for providing occupants of vehicles with information, the system comprising:
a first transmitter for intermittently transmitting short bursts of signals within a band of frequencies to reduce the duty of cycle and to permit a plurality of transmitters to operate within the same band of frequencies, said signals including a transmitter identification code that distinguishes the first transmitter from a second transmitter;
a receiver positioned in at least one of the vehicles receiving the information and including sweep tuning means for sweeping across said band of frequencies until said short bursts of signals are received;
storage means coupled to the receiver for storing a data base comprised of a plurality of messages grouped into a plurality of types of messages;
input means coupled to the receiver for allowing an occupant of the vehicle containing the receiver to specify a message code that identifies one of the types of messages included in the data base;
processing means for searching said data base for a first message that satisfies the message code and the transmitter identification code; and
display means for displaying the first message.

14. A communication system as in claim 13 wherein the bandwidth is approximately 150 MHz.

15. A communication system as in claim 13 wherein the sweep tuning means comprises a voltage controlled oscillator and a clock oscillator for producing a control voltage for controlling said voltage controlled oscillator.

16. A communications system as in claim 13 wherein the first transmitter operates in the microwave range of frequencies (10 GHz to 35 GHz).

17. A communications system as in claim 13 wherein the first transmitter includes a Gunn diode oscillator.

18. A method for conveying information to a vehicle comprising the steps of:
a) having a vehicle occupant specify a message type that identifies a type of message to be displayed by a display means located in a vehicle and coupled to a receiver;
b) transmitting short bursts of signals within a band of frequencies intermittently at predetermined intervals from a first transmitter to reduce the duty cycle and to permit a plurality of transmitters to operate within the same band of frequencies, said signals including a transmitter identification information that distinguishes the first transmitter from a second transmitter, the first transmitter including a microprocessor for controlling the encoding of the signals and for controlling the predetermined intervals;
c) sweeping the band of frequencies and receiving and decoding the message at the receiver as a received message, the received message including the transmitter identification information;
d) using the transmitter identification information contained in the received message in a microprocessor to scan a plurality of stored messages and generate a group of one or more messages based on the transmitter identification information and the message type specified by the vehicle occupant; and
e) displaying the group of one or more messages to the vehicle occupant.

19. A method for conveying information as in claim 18 wherein the short bursts of signals are transmitted in the microwave frequency range.

20. A communications system as in claim 1 wherein said short bursts of signals include message information and information uniquely identifying said transmitter.

21. A system for communicating to vehicles on a highway, said system comprising:
A plurality of transmitters disposed adjacent a highway, each of said transmitters comprising an antenna, an oscillator, a modulator, a controller and a power supply, said transmitters for intermittently transmitting short bursts of signals within a band of frequencies to reduce the duty cycle of said transmitters and to permit said plurality of transmitters to operate in the same band of frequencies without causing mutual interference, said short bursts of signals transmitted in accordance with a predetermined cycle, said controller provided with resident pre-programmed information for transmission in said short bursts of signals; and
a plurality of receivers disposed in vehicles located on said highway, each of said receivers comprising an antenna, a demodulator, a replaceable database, a microprocessor and a display, said receivers including sweep tuning means for sweeping across said band of frequencies until said short bursts of signals are received; messages resident in said replaceable database are displayed which correspond to the short bursts of signals transmitted by said transmitters, said microprocessors synthesizing complete messages from brief message fragments.

22. The system of claim 21 in which said transmitters further comprise a remote interface having an emergency vehicle interface, a central control interface and real-time sensors.

23. The system of claim 22 in which said transmitters comprise cavity-tuned Gunn diode oscillators that are allowed to drift with temperature within a predetermined band of frequencies to provide random frequency diversity.

24. The system of claim 23 in which said transmitters are further characterized in that they operate in a band of frequencies from 10 GHz to 35 GHz and are allowed to drift with temperature within a band 150 MHz wide.

25. The system of claim 23 which further comprises an interface with a voice play menu system, a cellular telephone, a telephone automatic answering circuit, a digital modem, a DTMF decoder and a PC/PW demodulator.

26. The system of claim 23 in which said power supply comprises a battery and a battery charger.

27. The system of claim 23 in which said modulator comprises a transistor arranged to controllably short circuit a resistor which interrupts power supplied to said oscillator.

28. The system of claim 23 in which said receivers further include means for permitting the user to select the type of information to be displayed.

29. The system of claim 23 in which said receivers are further characterized in that said replaceable database stores full messages and provides reconstruction of new messages from the short bursts of signals, the messages being linked together and displayed at said receivers.

30. The system of claim 29 in which said replaceable database may provide messages in any selected language.

31. The system of claim 23 further characterized in that said system includes means for storage of received signals and for computing direction of travel, thereby permitting prediction of transmitter codes and display of information relevant to future location of said vehicle.

32. The system of claim 24 in which said sweep tuning means sweeps approximately 150 MHz around the expected center frequency of said transmitters.

33. A system for communicating on a highway, said system comprising:

a plurality of transmitters disposed adjacent to a highway, each of said transmitters comprising an antenna, an oscillator, a modulator, a controller and a power supply, said transmitters for intermittently transmitting short bursts of signals within a band of frequencies to reduce the duty cycle of said transmitters and to permit said plurality of transmitters to operate in the same band of frequencies without causing mutual interference, said short bursts of signals transmitted in accordance with a predetermined cycle, said controller provided with resident pre-programmed information comprising instructions for traffic advisories, emergency messages, warnings of upcoming exits from the highway and driving instructions; and a plurality of receivers disposed in vehicles located on said highway, each of said receivers comprising an antenna, a demodulator, a replaceable database, a microprocessor and a display, said receivers including sweep tuning means for sweeping across said band of frequencies until said short bursts of signals are received; messages resident in said replaceable database are displayed which correspond to the short bursts of signals transmitted by said transmitters, said microprocessors synthesizing complete messages from brief message fragments.

* * * * *